Patented Feb. 9, 1926.

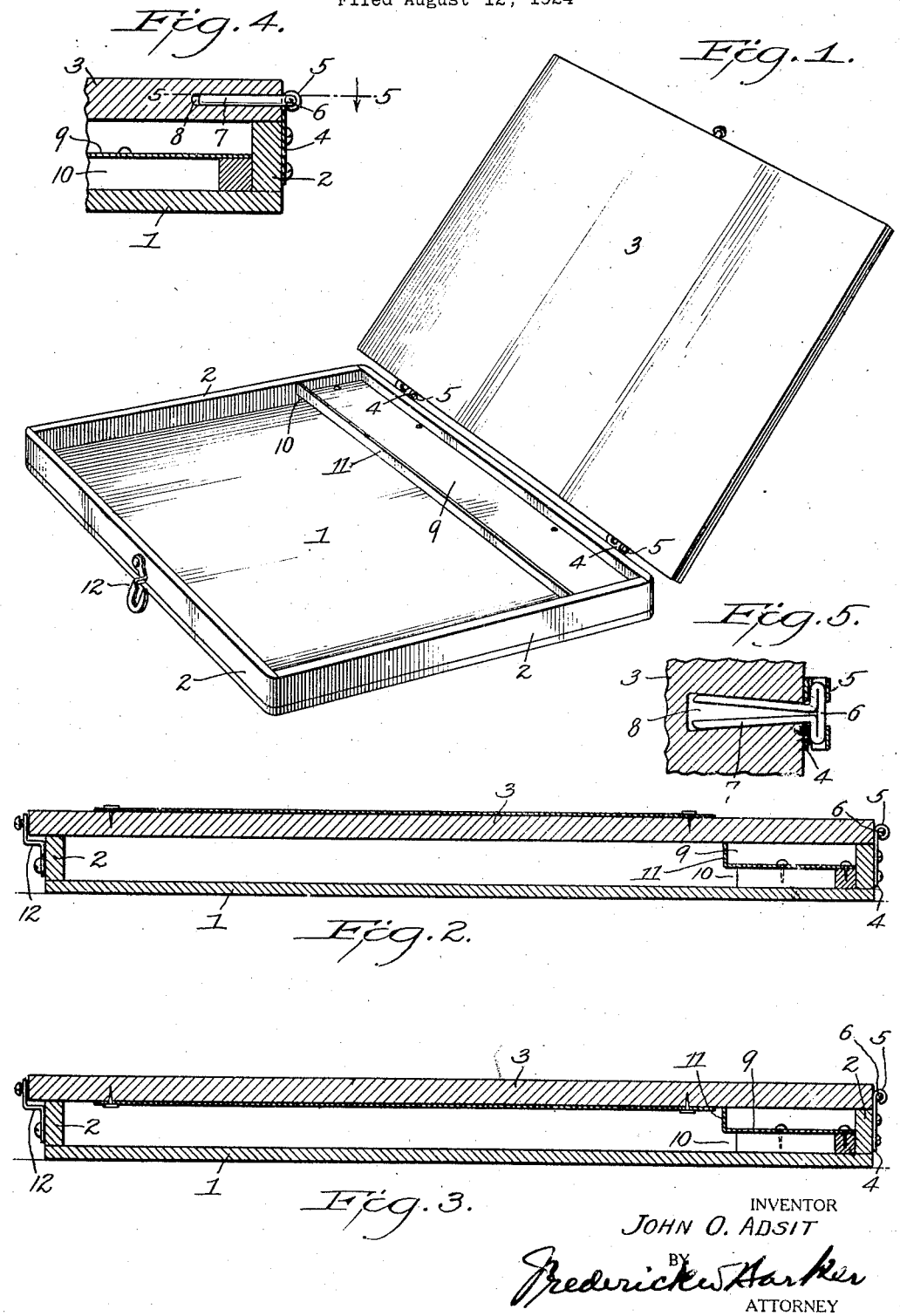

1,572,346

UNITED STATES PATENT OFFICE.

JOHN O. ADSIT, OF NEW YORK, N. Y.

DRAWING BOARD.

Application filed August 12, 1924. Serial No. 731,652.

*To all whom it may concern:*

Be it known that I, JOHN O. ADSIT, a citizen of the United States, residing at the borough of Manhattan, city, county, and State of New York, have invented new and useful Improvements in Drawing Boards, of which the following is a specification.

This invention relates to drawing boards, and my improvements are directed to a combined drawing board and mount therefor, wherein the mount may be in the form of a receptacle for drawing materials, and the board is in removable, hinged relation to the mount, so that said board may be reversible, to present either of its surfaces to the mount in closing thereon.

My improved drawing board has been devised to meet the requirements of artists and others having occasion to use a portable board and to have associated therewith containing means for drawings, as well as pencils and other accessories, also by reason of the board being reversible, to enable a drawing secured upon the exposed side of the board, to be faced inwardly without removal, for its protection during transportation.

Other features and advantages of my invention will hereinafter appear.

In the drawing:

Figure 1 is a perspective view of my combined drawing board and mount.

Fig. 2 is a cross-section thereof, the board and mount being closed together, with a drawing exposed.

Fig. 3 is a similar view, showing the drawing board reversed, with the drawing faced inwardly.

Fig. 4 is an enlarged sectional detail view showing the hinge.

Fig. 5 is a section on the line 5—5 of Fig. 4.

In said views I have shown a rectangular receptacle as composed of the base 1 and walls 2. These walls are low because it is desirable that the receptacle be quite shallow, the primary purposes thereof being to contain drawings, sketches and the like which will lie flat therein, to be securely contained within the receptacle by means of a flat, hinged cover 3. Said cover is in the form of a drawing board, and is intended to be used as such either while serving as a cover for the receptacle, or when removed therefrom. The hinged connection between the drawing board and receptacle is of such nature as to permit the ready removal of one from the other, and also to permit their re-assembly with the drawing reversed, thereby serving another purpose, which will presently appear.

To these ends a number of hinges 4 are securely attached to the outer surface of rear wall 2, said hinges having means of removable engagement with the drawing board, so that the latter may constitute a cover for the receptacle, said means of engagement being equally effective whichever surface of the drawing is exposed.

In the example shown these hinges are each composed of a socket member 5, secured to the receptacle wall, and a pintle member 6 which is pivotally engaged in said socket. The pintle member has a split pin 7 extended therefrom, like a cotter pin, which is adapted to be entered, with frictional binding effect, in a hole 8 provided therefor in the edge of the drawing board. Corresponding holes 8 serve to removably receive the pins 7 whether the drawing board or cover be turned one way or the other.

It will be apparent from the foregoing that the board or cover may be disengaged from the receptacle by simply pulling it apart from the hinges. Then the drawing board can be employed independently of the receptacle. There is however another important function which is fulfilled through the reversible nature of the board engagement with the receptacle, wherein a drawing which is in progress may be left pinned to the board and caused to face inwardly toward the receptacle in closing the board and receptacle together for transportation. This feature of my invention is highly appreciated by draughtsmen because they are thereby saved the necessity of realigning an unfinished drawing upon the board after transportation.

When the drawing board is being employed as such while in its hinged relation to the receptacle it may be horizontal in closed position, or it may be suitably inclined as an easel by placing a pencil or stick between its under surface and the receptacle base.

I have shown the receptacle as provided with a fixed tray 9 in its rearward portion. This tray is spaced from the base 1, leaving a clearance 10 to receive the ends of larger drawings and the like, and the tray has a forward wall 11 whose upper edge lies in the same plane as the top of walls 2, so that the drawing board, when closed to serve as a cover for the receptacle, will also effect closure of the tray and retain its contents therein during transportation.

Suitable fastening means as 12 may be employed to secure the board and receptacle in the closed position of the latter.

Variations within the spirit and scope of my invention are equally comprehended by the foregoing disclosure.

I claim:

1. Connecting means for a drawing board and a mount therefor, said drawing board having a socket recessed in an edge thereof, said connecting means comprising a hinge composed of pivotal parts, one of said parts being rigidly secured to said mount and the other part seating in said socket and adapted for removable engagement therewith.

2. Connecting means for a reversible drawing board and a mount therefor, said board having a socket recessed in an edge thereof, said connecting means comprising a hinge composed of pivotal parts, one of said parts being rigidly secured to said mount and means associated with the other part permitting removable engagement with said socket.

3. Connecting means for a drawing board provided with a socket recessed in an edge thereof and a receptacle, said connecting means comprising a hinge composed of pivotal parts, one of said parts being rigidly secured to said receptacle and the other part seating in said socket and adapted for removable engagement therewith.

Executed this 7th day of August, 1924.

JOHN O. ADSIT.